United States Patent
Fischer et al.

(10) Patent No.: US 8,400,323 B2
(45) Date of Patent: Mar. 19, 2013

(54) CAPACITIVE OCCUPANT SENSING SYSTEM AND METHOD

(75) Inventors: Thomas Fischer, Wenden (DE); Christian A Fischer, Remscheid (DE); Marcel Fruend, Remscheid (DE); Kai Niederhagen, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 580 days.

(21) Appl. No.: 12/642,938

(22) Filed: Dec. 21, 2009

(65) Prior Publication Data
US 2011/0148648 A1  Jun. 23, 2011

(51) Int. Cl.
*G08B 21/00* (2006.01)

(52) U.S. Cl. ................ 340/686.6; 340/667

(58) Field of Classification Search ........ 340/686.6, 340/667, 665; 180/273; 219/202
See application file for complete search history.

(56) References Cited

U.S. PATENT DOCUMENTS

| | | | |
|---|---|---|---|
| 5,164,709 A * | 11/1992 | Lamberty et al. ............ 340/667 |
| 5,165,055 A | 11/1992 | Metsler | |
| 5,914,610 A | 6/1999 | Gershenfeld et al. | |
| 6,161,070 A | 12/2000 | Jinno et al. | |
| 6,179,378 B1 | 1/2001 | Baumgartner et al. | |
| 6,236,908 B1 | 5/2001 | Cheng et al. | |
| 6,388,512 B1 | 5/2002 | Sims | |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,816,077 B1 | 11/2004 | Shieh et al. | |
| 6,877,606 B2 | 4/2005 | Hardy | |
| 6,960,841 B2 | 11/2005 | Saitou et al. | |
| 7,048,338 B2 | 5/2006 | Pinkos | |
| 7,084,763 B2 | 8/2006 | Shieh et al. | |
| 7,098,674 B2 * | 8/2006 | Stanley et al. ............ 340/667 |
| 7,102,527 B2 | 9/2006 | Shieh et al. | |
| 7,151,452 B2 | 12/2006 | Shieh | |
| 7,194,346 B2 | 3/2007 | Griffin et al. | |

(Continued)

FOREIGN PATENT DOCUMENTS
WO  WO9513204  5/1995

OTHER PUBLICATIONS

Pending U.S. Appl. No. 12/433,011, filed Apr. 30, 2009.

(Continued)

*Primary Examiner* — John A Tweel, Jr.
(74) *Attorney, Agent, or Firm* — Lawrence D. Hazelton

(57) ABSTRACT

An occupant detection system and method are provided for detecting an occupant seated in a vehicle seat. An electrode is arranged in a seat proximate to an expected location of an occupant for sensing an occupant proximate thereto. The electrode may be integrated with a seat heater. Control circuitry controls the seat heater. A signal generator is coupled to the electrode and configured output to the electrode a plurality of signals at a plurality of frequencies. Occupant detection circuitry detects voltages responsive to the plurality of signals at the plurality of frequencies and detects a state of occupancy based on the detected voltages. An LC circuit coupled to the electrode and the control circuitry suppresses capacitance generated by the control circuitry.

17 Claims, 3 Drawing Sheets

U.S. PATENT DOCUMENTS

| | | | |
|---|---|---|---|
| 7,859,423 B2 * | 12/2010 | Yamanaka et al. | 340/667 |
| 2002/0053980 A1 * | 5/2002 | Masuda et al. | 340/667 |
| 2004/0111201 A1 | 6/2004 | Thompson et al. | |
| 2005/0253712 A1 | 11/2005 | Kimura et al. | |
| 2006/0187038 A1 | 8/2006 | Shieh et al. | |
| 2008/0011732 A1 | 1/2008 | Ito et al. | |
| 2009/0008377 A1 * | 1/2009 | Nathan et al. | 340/667 |
| 2009/0267622 A1 | 10/2009 | Hansen et al. | |
| 2009/0271076 A1 | 10/2009 | Griffin | |

OTHER PUBLICATIONS

Pending U.S. Appl. No. 12/434,079, filed May 1, 2009.
Pending U.S. Appl. No. 12/433,993, filed May 1, 2009.
Pending U.S. Appl. No. 12/433,923, filed May 1, 2009.
International Search Report dated Feb. 15, 2011.

* cited by examiner

CAPACITIVE OCCUPANT SENSING SYSTEM AND METHOD

TECHNICAL FIELD

The present invention generally relates to occupant sensing systems, and more particularly relates to a system and method for detecting an occupant on a seat that includes an electrode configured to have a resonant frequency that is dependent on presence of an occupant.

BACKGROUND OF THE INVENTION

Automotive vehicles are commonly equipped with air bags and other devices that are selectively enabled or disabled based upon a determination of the presence of an occupant in a vehicle seat. It has been proposed to place electrically conductive material in a vehicle seat to serve as an electrode for detecting the presence of an occupant in the seat. For example, U.S. Patent Application Publication No. 2009/0267622 A1, which is hereby incorporated herein by reference, describes an occupant detector for a vehicle seat assembly that includes an occupant sensing circuit that measures the impedance of an electric field generated by applying an electric signal to the electrode in the seat. The presence of an occupant affects the electric field impedance about the electrode that is measured by the occupant sensing circuit. Additionally, many vehicle seats are equipped with a seat heater which generally includes an electrically conductive mat for receiving the electrical current which, in turn, generates thermal energy to heat the seat. Moreover, the seat heater has circuit elements in the control circuitry which, such as transistors, may interfere with the accuracy of measuring the electric field impedance. What is needed is a system and method that can determine the presence of an occupant in a vehicle seat having an electrode that is not adversely affected by the seat heater and its control circuitry.

SUMMARY OF THE INVENTION

According to one aspect of the present invention, an occupant detection system for a seat is provided. The system includes an electrode arranged in a seat proximate to an expected location of an occupant for sensing an occupant proximate thereto. The system also includes control circuitry for controlling an electrical device proximate to the seat. The system has a signal generator coupled to the electrode and configured output to the electrode a plurality of signals at a plurality of frequencies. The system also includes occupant detection circuitry for detecting voltages responsive to the plurality of signals at the plurality of frequencies and detecting a state of occupancy based on the detected voltages. The system further includes an LC circuit coupled to the conductive element and the control circuitry for suppressing capacitance generated by the control circuitry.

According to another aspect of the present invention, a method for detecting presence of an occupant in a seat having an electrode is provided. The method includes the steps of applying a plurality of signals at a plurality of frequencies to an electrode to generate an electric field proximate to the vehicle seat, and detecting voltage responses to the plurality of signals. The method also includes the step of suppressing capacitance generated by control circuitry with the use of an LC circuit coupled to the electrode and the control circuitry. The method further includes the step of detecting a state of occupancy of the seat based on the detected voltages.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
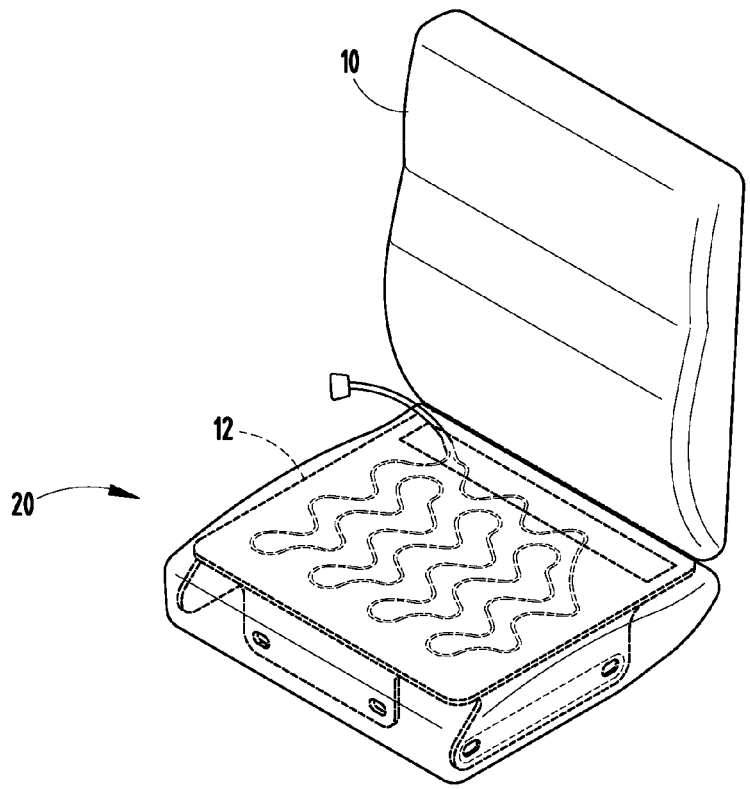
FIG. 1 is a perspective view of a seat assembly incorporating an occupant detection system using the seat heater mat, according to one embodiment.

Referring to FIG. 1, an exemplary automotive vehicle seat assembly 10 is generally shown having a top side seating surface suitable for supporting an occupant (not shown). The seat assembly 10 is adapted to be installed in a vehicle passenger compartment such as a car seat, according to one embodiment, but could be used in any kind of vehicle, such as an airplane according to another embodiment. The seat assembly 10 has an electrode 12 installed in the seat assembly 10. According to one embodiment, the electrode 12 employs an electrically conductive heater element in the form of a mat which serves as a seat heater and also serves as the electrode for sensing occupancy of the seat. The electrically conductive element 12 effectively serves both as a seat heater to heat the seat when energized and as an electrode or antenna to detect occupancy of the seat. The electrically conductive element 12 may be formed of suitable materials that allow for electrical conductivity for electrode sensing and electrical heating which includes metal wire, conductive fiber, metal foil, metal ribbon and conductive ink. The vehicle seat assembly 10 also includes an occupant detection system 20 which utilizes the electrically conductive element 12 as an electrode for sensing occupancy of the seat assembly 10.

Figure 2:
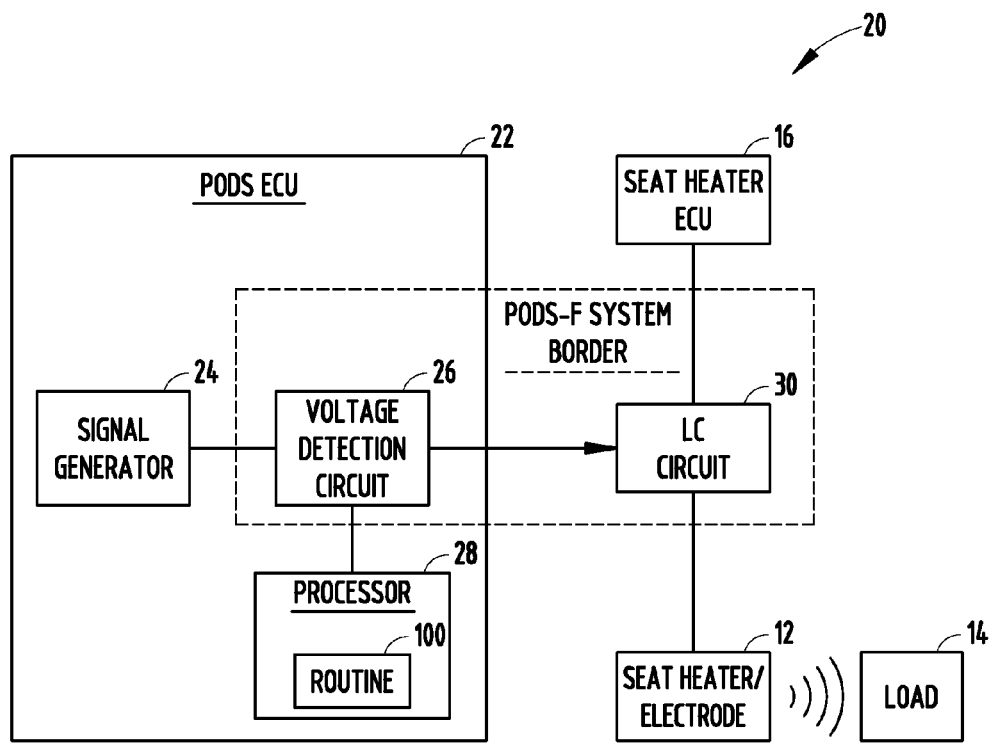
FIG. 2 is a block diagram of the occupant detection system.

The occupant detection system 20 is illustrated in FIG. 2. The combination seat heater/electrode element or mat 12 is shown coupled to control circuitry shown as an electronic control unit (ECU) 16 for controlling an electrical device. In one embodiment, the electrical device is the seat heater and the control circuitry controls the seat heater to turn the seat heater on and off. This may be achieved by applying electrical current to the electrically conductive element 12. The seat heater ECU 16 may include a plurality of field effect transistors (FETs) to turn the heater on and off as is generally known in the art. The field effect transistors employed in seat heater control circuitry are generally known to produce capacitance values which can interfere with capacitive sensing arrangements.

The occupant detection system 20 also includes passenger occupant detection system (PODS) control circuitry shown as an electronic control unit (ECU) 22 which controls the occupant detection applied via the combined seat heater/electrode element 12. The passenger occupant detection system (PODS) ECU 22 is shown including a signal generator 24, a voltage detection circuit 26, and processing circuitry 28. The signal generator 24 is configured to output a plurality of alternating current (AC) signals at different frequencies. This may include generating a first sine wave signal at a first frequency during a first time period, a second signal at a second sine frequency during a second time period, etc. A total of n AC signals at n frequencies may be generated, where n is a whole integer. The plurality of n signals may be output simultaneously or sequentially by the signal generator 24.

The signal generator 24 is in communication with the seat heater/electrode element 12 which is configured to generate an electric field in response to the signals from the signal generator 24. The electric field is projected to a location at which an object (occupant) is to be detected, such as the seating area of the seat assembly 10. The impedance of a load 14 affects the voltage response received by the voltage detection circuitry 26. The voltage detection circuitry 26 measures a voltage for each of the n frequencies at the n time periods. The measured voltages may depend upon the impedance of the load 14 which may include impedance caused by an occupant and environmental conditions such as humidity, moisture and temperature.

The PODS ECU 22 also includes processing circuitry 28 in communication with the voltage detection circuitry 26. The signal processing circuitry 28 may include a processor, such as a microprocessor or other digital circuitry. The processor 28 is shown including a routine 100 which may be executed by the processor 28. It should be appreciated that the processing circuitry 28 may include a plurality of noise filters (not shown) and may convert the measured voltages into digital voltage amplitudes. The voltage amplitudes are compared to determine if a change in voltage has occurred amongst the plurality of frequencies. A change or difference in voltages is indicative of the presence of an environmental condition that will affect the impedance of the load 14.

The occupant detection system 20 may be used to enable, disable or change the response of a vehicle air bag system or other vehicle systems. In some applications, deployment of an air bag may be enabled when a person or object of a specific size or shape is seated in the vehicle. The size of a person may be proportional to the person's impedance and will affect the voltage sensed by the electrode element 12. Additionally, environmental conditions may affect the loading on the system, such as humidity, moisture in the vehicle, temperature, and other environmental conditions. To actively control deployment of a system, the system 20 may compensate for detected environmental conditions.

The occupant detection system 20 includes an inductor and capacitor (LC) circuit 30 coupled to the PODS control circuitry 22 and the seat heater/electrode mat 12 to prevent or reduce adverse effects caused by control circuitry 16. The occupant detection system 20 measures the frequency response and calculates the resistance, inductance and capacitance (RLC), and suppresses the capacitance values produced by ECU control circuitry 16, including the field effect transistors inside the seat heater ECU control circuitry 16 by utilizing the LC circuit 30. The RLC parameters are calculated using a best fit curve matching technique. According to one embodiment, the best fit curve matching technique 10 is a Levenburg-Marquardt algorithm. The use and processing of the LC circuit 30 advantageously allows for suppression of the interfering capacitance values such that the occupant detection may be performed without requiring that the seat heater 12 be turned on and off for heating purposes.

Figure 3:
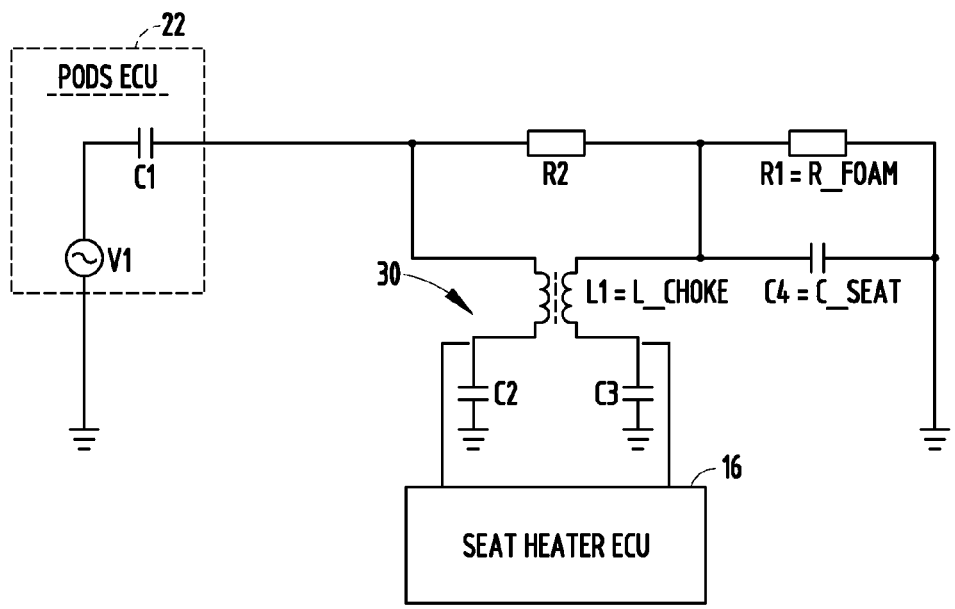
FIG. 3 is a block/circuit diagram of the occupant detection system, according to one embodiment.

Referring to FIG. 3, the occupant detection system 20 is further illustrated showing the LC circuit 30 and the seat heater circuit generally coupled to the electrically conductive electrode element 12 and the seat heater control circuitry 16. The LC circuit 30 includes a common mode choke L1 to suppress the effects of external capacitance influences. The common mode choke L1 is shown as an inductor having inductive L_choke. The LC circuit 30 also includes one or more capacitors coupled to ground. In the embodiment shown, first and second capacitors C2 and C3 are shown coupled to ground. The capacitors C2 and C3 maintain a stable ground coupling at the exterior of the choke L1. In one embodiment, the common mode choke L1 may have an inductance L_choke of approximately 1 millihertz with a 5 amp maximum current, and the capacitors C2 and C3 may each have a capacitance value of approximately 3.3 microfarads.

The load 14 is generally illustrated having an occupant capacitance C4 also represented by capacitance C_seat which generally is the capacitance of the occupant caused by the occupant impedance. Additionally, the load 14 has resistance values that include the heater resistance R2 and resistance of the foam seat R1 also shown as R_foam. The occupant capacitance C4 is measured inside of the choke L1. It should be appreciated that the load 14 may vary based upon environmental conditions and occupant detection. An occupant generally affects the capacitance term, whereas certain environmental conditions such as humidity affect the resistance term, and other environmental conditions such as temperature affect the inductance term of the load 14. By knowing the frequency response formula, three unknown values of the seat heater resistance to ground (R), changes to the choke inductance (L) due to temperature and part-to-part variation, and the capacitive load (C) of the seat are calculated using a best fit curve fitting technique, such as the Levenburg-Marquardt parameter estimation algorithm, according to one embodiment. The Levenburg-Marquardt parameter estimation algorithm may be represented by the following transfer function of the LCR circuit:

$$V_{RS} = \frac{V_{ES} \cdot 2\pi f \cdot C_0}{\sqrt{\left(2\pi f C_0 2\pi f C_X + \frac{2\pi f C_1}{1-(2\pi f)^2 L_X C_1}\right)^2 + \left(\frac{1}{R_X}\right)^2}}$$

where $V_{RS}$ is the amplitude of the response signal, $V_{ES}$ is the amplitude of the exciting signal, f is the frequency of the exciting signal, $C_O$ and $C_1$ are constant parameters, and $C_{X'}$, $R_{X'}$ and $L_X$ are variable parameters.

The occupant detection system 20 measures the voltage signal at n different frequencies over a desired frequency range and calculates the variable parameters $C_{X'}$, $R_{X'}$ and $L_X$ based on the curve fitting technique using the Levenburg-Marquardt algorithm. The curve fitting technique may be performed on the fly to achieve the best fit curve such that the capacitance value C4=C_seat indicative of occupancy can be solved for. For example, the occupant detection system 20 may measure voltages at each of frequencies from 100 kilohertz to 500 kilohertz at 50 kilohertz separations and at a sampling rate of about 100 milliseconds, according to one example. The range of frequencies may be from 10 kilohertz to 1 megahertz, according to one embodiment. The occupant capacitance C4 is then compared to a threshold capacitance value to determine whether or not the seat has an occupant and whether the occupant has a minimal size. The capacitance threshold may be adjusted based upon environmental conditions, such as humidity or whether the seat is wet, according to one embodiment. This may be achieved by empirical testing.

Figure 4:
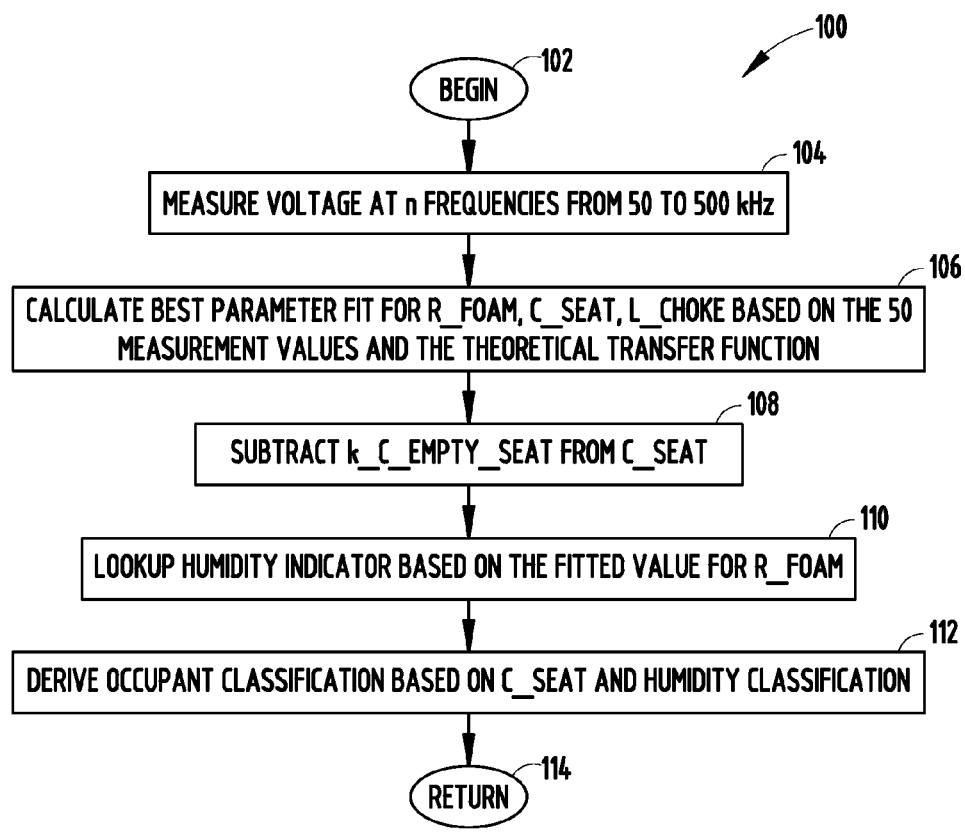
FIG. 4 is a flow diagram illustrating a routine for determining occupant classification by processing signals with the seat heater.

Referring to FIG. 4, the routine 100 is illustrated beginning at step 102 and proceeding to step 104 to measure the voltage response of n frequencies from 50 to 500 kilohertz. This may include voltage measurements taken at frequencies of 50 to 500 kilohertz with 50 kilohertz separation according to one embodiment. Next, routine 100 calculates the best parameter fit for the foam resistance R_foam, the seat capacitance C_seat and the choke inductance L_choke, based on the n measurement values and a theoretical transfer function in step 106. Next, at step 108, routine 100 subtracts the offset capacitance k_C_empty_seat from the seat capacitance C_seat. Routine 100 then looks up the humidity indicator based on the fitted value for resistance of the foam R_foam in step 110. Finally, at step 112, routine 100 derives the occupant classification based on the seat capacitance C_seat and humidity classification. This is achieved by comparing the capacitance to a threshold capacitance value and adjusting the threshold based on the humidity.

Figure 5:
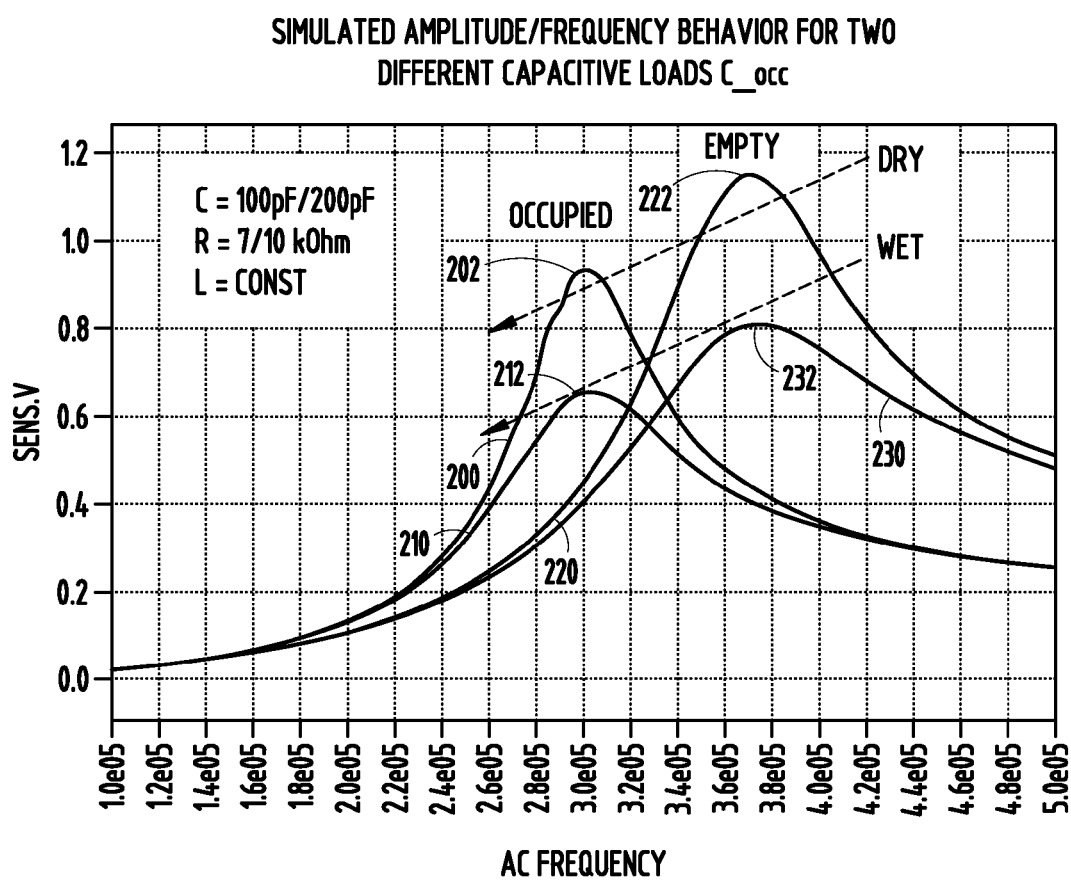
FIG. 5 is a graph illustrating simulated amplitude/frequency behavior for two different capacitive loads under dry and wet environmental conditions, according to one example.

Referring to FIG. 5, a simulation of the amplitude/frequency behavior for curves at two different capacitive loads, namely empty and occupied, is illustrated. In this example, the inductance is constant, and the resistance may vary depending upon the environmental conditions, such as humidity of the seat specifically whether the seat is dry or wet. The capacitance will vary depending on whether the seat is occupied or empty as indicated by 100 picofarads (pF) versus 200 picofarads (pF). As seen, an occupied seat be detected in curve 200 by a sensed voltage peak 202 at a certain frequency, and an empty seat condition can be detected by curve 220 by a different frequency response peak voltage 222 when the seat is dry. If the seat is wet, the voltage will generally be less due to the increased resistance and hence the lower curve 210 shows an occupied seat at peak voltage 212 and curve 230 shows an empty seat at peak voltage 232.

Accordingly, the occupant detection system advantageously detects an occupant of a seat, such as a vehicle seat, in a manner that minimizes capacitive interference, particularly interference caused by control circuitry. The occupant detection system advantageously integrates the electrode with the seat heater and compensates for interference caused by control circuitry associated with the seat heater. Integration of the electrode and the seat heater allows for a reduced cost vehicle seat, as duplicative components are eliminated. Additionally, it should be appreciated that other control circuitry for controlling other devices may be employed, such as a seat cooler, and that the LC circuit may compensate for interference caused by other such devices.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An occupant detection system for a seat comprising:
an electrode formed of a conductive element and arranged in a seat proximate to an expected location of an occupant for sensing an occupant proximate thereto;
control circuitry for controlling an electrical device proximate to the seat;
a signal generator coupled to the electrode and configured to output to the electrode a plurality of signals at a plurality of frequencies;
occupant detection circuitry for detecting voltages responsive to the plurality of signals at the plurality of frequencies and detecting a state of occupancy based on the detected voltages; and
an LC circuit coupled to the conductive element and the control circuitry for suppressing capacitance generated by the control circuitry, wherein the electrode comprises a seat heater element and the control circuitry controls the heater element.

2. The occupant detection system as defined in claim 1, wherein the electrical device comprises a seat heater.

3. The occupant detection system as defined in claim 1, wherein the LC circuit comprises a common mode choke.

4. The occupant detection system as defined in claim 3, wherein the LC circuit further comprises one or more capacitors coupled to ground.

5. The occupant detection system as defined in claim 4, wherein the LC circuit comprises first and second capacitors coupled to ground.

6. The occupant detection system as defined in claim 1, wherein the electrode is located in a vehicle seat.

7. The occupant detection system as defined in claim 1, wherein the occupant detection circuitry determines resistance, capacitance and inductance at each of a plurality of frequencies and further determines a best fit curve, wherein the capacitance is compared to a threshold value to detect the state of occupancy.

8. The occupant detection system as defined in claim 7, wherein the best fit curve is determined using a Levenburg-Marquardt algorithm.

9. The occupant detection system as defined in claim 7, wherein the threshold value changes based on a detected environmental condition.

10. A method for detecting presence of an occupant in a vehicle seat having an electrode, said method comprising the steps of:
applying a plurality of signals at a plurality of frequencies to an electrode to generate an electric field proximate to the vehicle seat;
detecting voltage responses to the plurality of signals;
suppressing capacitance generated by control circuitry with the use of an LC circuit coupled to the electrode and control circuitry; and
detecting a state of occupancy of the seat based on the detected voltages, wherein the electrode comprises a heater and the control circuitry controls the heater.

11. The method as defined in claim 10, wherein the LC circuit comprises a common mode choke.

12. The method as defined in claim 11, wherein the LC circuit further comprises one or more capacitors coupled to ground.

13. The method as defined in claim 12, wherein the LC circuit comprises first and second capacitors coupled to ground.

14. The method as defined in claim 10, wherein the electrode is located in a vehicle seat.

15. The method as defined in claim 10, wherein the method determines a best fit curve of the resistance, capacitance, and inductance and compares the capacitance to a threshold value to detect the state of occupancy.

16. The method as defined in claim 15, wherein the best fit curve is determined based on a Levenburg-Marquardt algorithm.

17. The method as defined in claim 15, wherein the threshold value changes based on a detected environmental condition.

* * * * *